United States Patent
Reiner et al.

(10) Patent No.: US 10,262,019 B1
(45) Date of Patent: Apr. 16, 2019

(54) DISTRIBUTED MANAGEMENT OPTIMIZATION FOR IOT DEPLOYMENTS

(71) Applicant: EMC IP Holding Company LLC, Hopkinton, MA (US)

(72) Inventors: David Stephen Reiner, Lexington, MA (US); Nihar Nanda, Acton, MA (US); Said Tabet, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 15/712,834

(22) Filed: Sep. 22, 2017

(51) Int. Cl.
| | |
|---|---|
| *G06F 19/00* | (2018.01) |
| *G06F 17/30* | (2006.01) |
| *G06F 11/07* | (2006.01) |
| *G06F 21/57* | (2013.01) |
| *G06F 21/55* | (2013.01) |

(52) U.S. Cl.
CPC ...... *G06F 17/30339* (2013.01); *G06F 11/079* (2013.01); *G06F 17/30575* (2013.01); *G06F 17/30994* (2013.01); *G06F 21/552* (2013.01); *G06F 21/577* (2013.01)

(58) Field of Classification Search
CPC .................................................. G06Q 10/06
USPC ........................................................ 700/100
See application file for complete search history.

(56) References Cited

U.S. PATENT DOCUMENTS

| | | | |
|---|---|---|---|
| 8,838,556 B1 | 9/2014 | Reiner et al. | |
| 8,972,637 B1 | 3/2015 | Hushon, Jr. et al. | |
| 9,020,802 B1 | 4/2015 | Florissi et al. | |
| 9,031,992 B1 | 5/2015 | Florissi et al. | |
| 9,075,668 B1 | 7/2015 | Hushon et al. | |
| 9,141,908 B1 | 9/2015 | Reiner et al. | |
| 9,158,843 B1 | 10/2015 | Florissi et al. | |
| 9,420,548 B2 * | 8/2016 | Teague | H04W 52/243 |
| 9,477,691 B1 | 10/2016 | Reiner et al. | |
| 9,600,358 B1 | 3/2017 | Reiner et al. | |

(Continued)

OTHER PUBLICATIONS

Vermesan et al, Internet of Things—From Research and Innovation to Market Deployment, 2014, River Publisher, pp. 374 (Year: 2014).*

(Continued)

*Primary Examiner* — Suresh Suryawanshi
(74) *Attorney, Agent, or Firm* — Ryan, Mason & Lewis, LLP

(57) ABSTRACT

An apparatus in one embodiment comprises a processing platform implementing an Internet of Things (IoT) distributed management system accessible to a plurality of user devices over at least one network. The processing platform is configured to determine IoT infrastructure for a given IoT deployment in at least one particular usage context, to control placement of multiple workflow processes for the IoT deployment over a plurality of distributed locations within the IoT infrastructure, and to manage execution of the workflow processes at the distributed locations in accordance with one or more constraints of the particular usage context. The IoT deployment comprises one or more IoT platforms each configured to interact with a different set of IoT devices. The placement of multiple workflow processes over the plurality of distributed locations illustratively provides a designated distribution of data, services, applications and analytics for the IoT deployment in the particular usage context.

20 Claims, 7 Drawing Sheets

(56) References Cited

U.S. PATENT DOCUMENTS

| | | | | |
|---|---|---|---|---|
| 9,847,961 | B2* | 12/2017 | Shuman | H04W 4/70 |
| 2015/0019342 | A1* | 1/2015 | Gupta | G06Q 10/20 |
| | | | | 705/14.66 |
| 2016/0323156 | A1* | 11/2016 | Zakaria | H04L 43/04 |
| 2016/0357521 | A1* | 12/2016 | Zhang | G06F 8/34 |
| 2017/0006116 | A1* | 1/2017 | Kelly | H04L 41/04 |
| 2017/0201585 | A1* | 7/2017 | Doraiswamy | H04L 41/0806 |
| 2017/0230461 | A1* | 8/2017 | Verma | G06F 3/0482 |
| 2017/0371937 | A1* | 12/2017 | Shah | G06F 8/71 |
| 2018/0260200 | A1* | 9/2018 | Karagiannis | G06F 8/60 |
| 2018/0285062 | A1* | 10/2018 | Ulaganathan | G06F 3/167 |
| 2018/0332117 | A1* | 11/2018 | Street | G06F 8/654 |
| 2018/0337769 | A1* | 11/2018 | Gleichauf | G06Q 20/065 |

OTHER PUBLICATIONS

Chui et al, The Internet of Things, 2010, McKinsey & Company, pp. 10 (Year: 2010).*

Vogler et al, A Scalable Framework for Provisioning Large-Scale IoT Deployments, Mar. 2016, ACM Trans. Internet Technol., pp. 20 (Year: 2016).*

U.S. Appl. No. 14/487,520 filed in the name of Nihar Nanda et al. Sep. 16, 2014 and entitled "Data Set Virtual Neighborhood Characterization, Provisioning and Access."

E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

U.S. Appl. No. 15/074,597 filed in the name of David Stephen Reiner et al. Mar. 18, 2016 and entitled "Data Set Discovery Engine Comprising Relativistic Retriever."

U.S. Appl. No. 15/497,484 filed in the name of Stephen Todd et al. Apr. 26, 2017 and entitled "Automated Assignment of Data Set Value Via Semantic Matching."

International Telecommunications Union, "Series Y: Global Information Infrastructure, Internet Protocol Aspects and Next-Generation Networks—Next Generation Networks—Frameworks and Functional Architecture Models—Overview of the Internet of Things," Recommendation ITU-T Y.2060, Jun. 2012, 22 pages.

V.K. Vavilapalli et al., "Apache Hadoop YARN: Yet Another Resource Negotiator," Proceedings of the 4th Annual Symposium on Cloud Computing (SOCC), Oct. 2013, 16 pages, Article No. 5.

M. Leone et al., "Dell EMC Digital Platform for Enterprise Assets and Internet of Things," Enterprise Strategy Group (ESG) Lab Review, May 2017, 11 pages.

Nik Rouda, "Dell EMC: Simplify Digital Transformation with Enterprise IoT for Improved Business Outcome," Enterprise Strategy Group (ESG) Solution Showcase, Mar. 2017, 7 pages.

U.S. Appl. No. 15/654,045 filed in the name of Nihar Nanda et al. Jul. 19, 2017 and entitled "Processing Platform Configured for Data Set Management Utilizing Metadata-Based Data Set Operational Signatures."

U.S. Appl. No. 15/223,619 filed in the name of Said Tabet et al. Jul. 29, 2016 and entitled "Automated Configuration and Deployment of Internet of Things Platforms."

U.S. Appl. No. 14/614,011 filed in the name of David Reiner et al. Feb. 4, 2015 and entitled "Integrated Compliance and Analytic Environments Through Data Lake Cross Currents."

U.S. Appl. No. 13/832,412 filed in the name of David S. Reiner et al. Mar. 15, 2013 and entitled "A Holistic Methodology for Big Data Analytics."

* cited by examiner

400

500

DISTRIBUTED MANAGEMENT OPTIMIZATION FOR IOT DEPLOYMENTS

FIELD

The field relates generally to information processing systems, and more particularly to information processing systems that process information from devices associated with the Internet of Things (IoT).

BACKGROUND

Information processing systems can be configured to process data from distributed sensors, smart objects, smart appliances, smart automobiles or other types and arrangements of interconnected IoT devices. However, as the number of IoT devices continues to increase, the implementation of IoT-based systems under conventional practice presents a number of significant problems. For example, these systems can be very difficult to scale to increasingly larger numbers of IoT devices of different types due to the high level of complexity of individual customer use cases. In addition, there are wide variations between different IoT environments across verticals. As a result, IoT-based systems are often deployed as single-vendor solutions that are configured for a particular customer use case within a given vertical, and not readily adaptable to other use cases or verticals. Such arrangements tend to increase the costs of deploying IoT-based systems while also limiting their performance. Moreover, excessive manual intervention is often required in deploying a given IoT-based system.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

It should also be noted that illustrative embodiments can include, without limitation, apparatus, systems, methods, and computer program products comprising processor-readable storage media.

Figure 1:
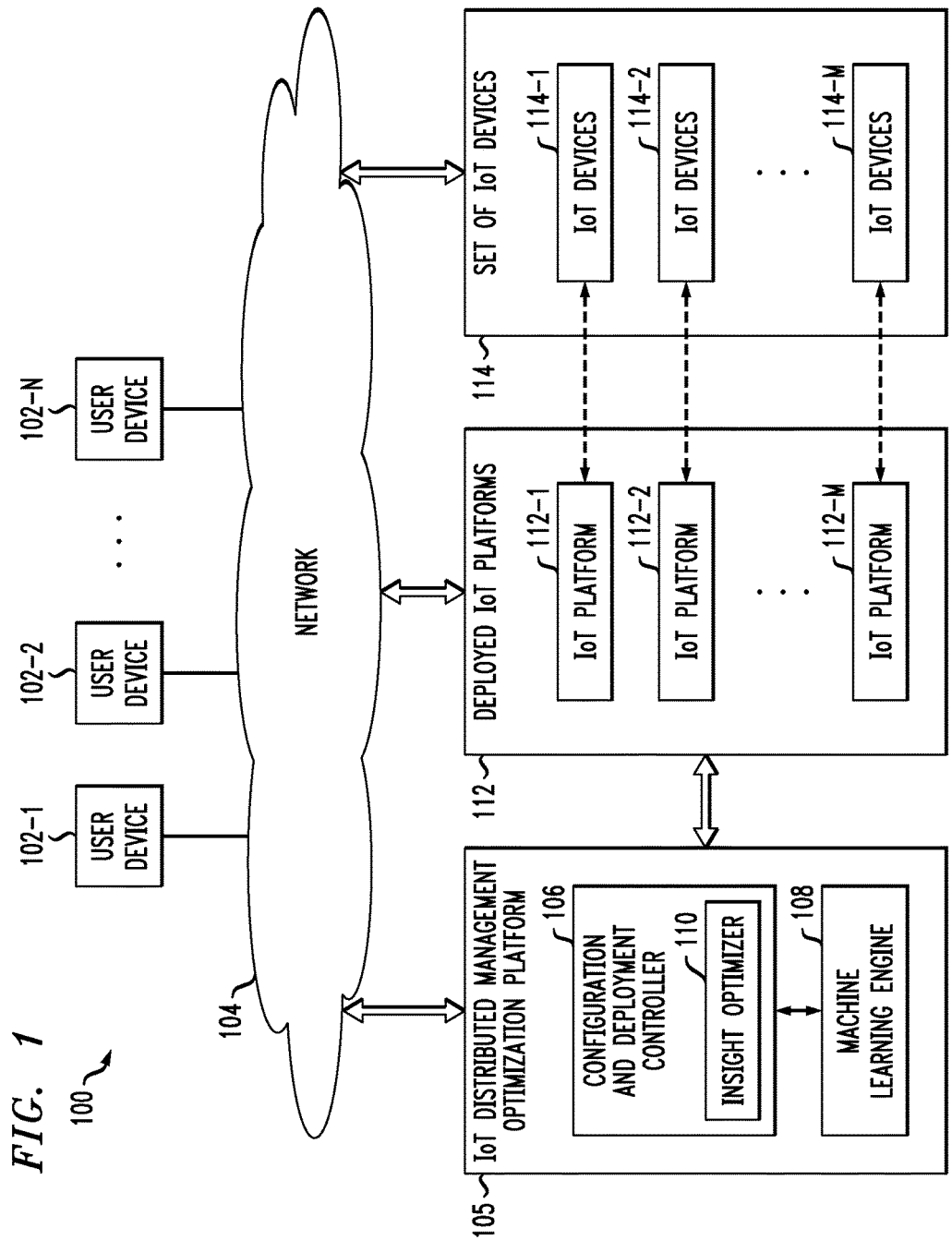
FIG. 1 shows an information processing system having functionality for distributed management optimization for IoT deployments in an illustrative embodiment.

FIG. 1 shows an information processing system 100 configured in accordance with an illustrative embodiment of the present invention. The information processing system 100 is assumed to be built on at least one processing platform and provides functionality for automated distributed management optimization for IoT deployments. In this embodiment, the system 100 more particularly comprises a plurality of user devices 102-1, 102-2, . . . 102-N coupled to a network 104. Also coupled to the network 104 is an IoT distributed management optimization platform 105 comprising a configuration and deployment controller 106 having an associated machine learning engine 108. The configuration and deployment controller 106 further comprises an insight optimizer 110. The IoT distributed management optimization platform 105 is accessible to the user devices 102 over the network 104.

The user devices 102 can comprise, for example, desktop, laptop or tablet computers, mobile telephones, or other types of processing devices capable of communicating with the IoT distributed management optimization platform 105 over the network 104. One or more of the user devices 102 can each include at least one of a graphical user interface (GUI), an application programming interface (API) or another type of interface to one or more corresponding service interfaces of the platform 105 in order to support direct user access to IoT distributed management optimization functionality within the system 100.

The "users" in a given embodiment may refer, for example, to respective ones of the user devices 102, although the term "user" as utilized herein is intended to be broadly construed so as to encompass numerous other arrangements of human, hardware, software or firmware entities, as well as combinations of such entities. Accordingly, a user may be a human user, or a software entity such as an application, or any of a wide variety of other entity arrangements.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The platform 105 is assumed to be implemented using one or more processing devices each having at least one processor coupled to a memory. Such processing devices can illustratively include particular arrangements of compute, storage and network resources. For example, the virtual resources can include virtual machines (VMs) or Linux containers (LXCs), or combinations of both as in an arrangement in which Docker containers or other types of LXCs are configured to run on VMs.

The platform 105 is considered a type of processing platform. The term "processing platform" as used herein is intended to be broadly construed so as to encompass multiple sets of processing devices and associated storage systems that are configured to communicate over one or more networks. For example, distributed implementations of the platform 105 and other platforms disclosed herein are possible, in which certain components of the platform reside in one data center in a first geographic location while other components of the platform reside in one or more other data centers in one or more other geographic locations that are potentially remote from the first geographic location. Numerous other distributed implementations of platform 105 are possible.

The IoT distributed management optimization platform 105 is also an example of what is more generally referred to herein as an "IoT distributed management system." The platform 105 is accessible to at least a subset of the user devices 102 over the network 104, and is configured to determine IoT infrastructure for a given IoT deployment in at least one particular usage context, to control placement of multiple workflow processes for the IoT deployment over a plurality of distributed locations within the IoT infrastructure, and to manage execution of the workflow processes at the distributed locations in accordance with one or more constraints of the particular usage context.

The given IoT deployment illustratively comprises a particular one of a plurality of deployed IoT platforms 112-1, 112-2, . . . 112-M, which are configured to interact with respective sets of IoT devices 114-1, 114-2, 114-M.

The configuration and deployment controller 106 in some embodiments determines corresponding sets of IoT infrastructure resources for implementation of the respective deployed IoT platforms 112. As noted above, each of the deployed IoT platforms 112 is configured to interact with a different one of the sets of IoT devices 114.

In other embodiments, multiple ones of the deployed IoT platforms 112 can interact with the same set of IoT devices 114. Moreover, the various sets of IoT devices 114 are not necessarily disjoint sets. Accordingly, two or more of the sets may each include one or more of the same IoT devices.

It is also possible that a given one of the deployed IoT platforms 112 can itself comprise multiple distinct IoT platforms each configured to interact with a different set of IoT devices.

For example, the given deployed IoT platform can include multiple distinct sub-platforms each associated with respective different subsets of the corresponding set of IoT devices. Numerous other alternative arrangements of IoT platforms and associated IoT devices can be used in other embodiments.

The deployed IoT platforms 112 and their respective associated sets of IoT devices 114 are also shown as being coupled to the network 104. The deployed IoT platforms 112 can additionally or alternatively communicate directly with the IoT distributed management optimization platform 105 as illustrated. Similarly, each of the deployed IoT platforms 112 can additionally or alternatively communicate directly with its corresponding set of IoT devices 114 rather than relying on the network 104 for such communications.

A more particular example of a set of resources that may be utilized in deployment of a given one of the IoT platforms 112 will be described in more detail below in conjunction with the illustrative embodiment of FIG. 3.

The platform 105 in some embodiments is configured to automatically generate the multiple workflow processes for the IoT deployment for placement over the plurality of distributed locations within the IoT infrastructure. Additionally or alternatively, the platform 105 can be configured to automatically balance multiple constraints relating to the placement and execution of the multiple workflow processes.

In the FIG. 1 embodiment, the placement of multiple workflow processes for the IoT deployment over the plurality of distributed locations within the IoT infrastructure provides a designated distribution of data, services, applications and analytics for the IoT deployment in the particular usage context.

The plurality of distributed locations within the IoT infrastructure illustratively comprise IoT device locations, gateway locations, edge node locations, fog node locations, core data center locations and cloud locations. A given pair of locations is illustratively interconnected by a corresponding one-way or two-way connection that allows for flow of data streams, messaging, service invocations or other interactions. The connection is subject to a connection latency that represents latency of communication due to synchronization of information, services, processes or other information between the corresponding pair of locations. The platform in controlling placement of the multiple workflow processes takes these and other latencies into account, as will be described in more detail elsewhere herein.

References herein to "controlling placement" and "managing execution" of multiple workflow processes at distributed locations are intended to be broadly construed so as to encompass, for example, actual deployment of the workflow processes, including "hooking up" or otherwise configuring the workflow processes for supporting any required inter-process interactions across their respective locations.

The platform 105 in managing the execution of the workflow processes at the distributed locations in accordance with one or more constraints of the particular usage context is further configured to arrange at least a subset of the workflow processes in a plurality of process lanes each corresponding to one or more of data acquisition, data aggregation, data reconciliation, analytics, insight, decision and action, and to control transitions among the process lanes based at least in part on the one or more constraints of the particular usage context. The process lanes may be viewed as conceptual process lanes, utilized to facilitate management of the execution of the corresponding workflow processes.

The transitions among the process lanes in some embodiments may be configured in accordance with a designated transition sequence such as:

Data→Data Aggregation→Insights→Decisions→Actions

The transitions among the process lanes in such an arrangement illustratively move in a direction of increasing value, from the acquisition of data towards desired benefits and outcomes of the given IoT deployment. A given action in some embodiments can include notification of a particular human user.

Examples of suitable constraints of a particular usage context include a minimum time interval constraint for transitioning from a first one of the process lanes to a second one of the process lanes, a maximum time interval constraint for transitioning from a first one of the process lanes to a second one of the process lanes, and data age constraints between data acquisition and one or more of data aggregation, data reconciliation, analytics, insight, decision and action. A more detailed example of such process lanes will be described below in conjunction with the illustrative embodiment of FIG. 5.

The term "usage context" herein is intended to be broadly construed so as to encompass a variety of different situations in which insights are possible that may lead to action. For example, an automated operations manager may be configured to determine when a motor is overheating so that it can slow it down or shut it off. As another example, an automated oil rig manager may be configured to anticipate a potential disastrous event and proactively avoid it. As a further example, an automated marketer may be configured to understand where a cell phone user is currently located to do location-based marketing.

The term "workflow process" is also intended to be broadly construed, and may encompass, for example, processes such as Collect Data, Stream Data, Filter Data, Aggregate Data, Look Up Data, Send Message, Invoke Service, Reach Insight, Reach Decision, Trigger Action, Complete Action, and Notify of Action. These and other workflow processes referred to herein may have associated metadata.

A "workflow" for a given usage context or set of multiple usage contexts can be characterized as a digraph of workflow processes assigned to respective ones of the multiple distributed locations within the IoT infrastructure. Such a workflow is illustratively characterized by a "workflow benefit" indicative of the benefit of completing the workflow within the relevant constraints. Examples of workflow benefits include asset retains value, asset operates more efficiently, asset has higher quality, a valuable opportunity is not lost, a better outcome is reached, etc. A given workflow also illustratively has an associated latency profile, providing an assessment of multiple latencies associated with processes, locations and connections of the given workflow, including, by way of example, minimum, maximum, average or other specified values for each such latency.

The configuration and deployment controller 106 of the platform 105 is further configured to optimize the IoT deployment in the particular usage context utilizing a multi-level optimization process including at least two of IoT infrastructure optimization, usage context optimization and monitoring-based iterative optimization. Such optimization is illustratively implemented using insight optimizer 110 of the configuration and deployment controller 106. A more detailed example of a multi-level optimization process will be described below in conjunction with FIG. 6. Additional details regarding one possible implementation of insight optimizer 110 will be provided below in conjunction with the description of FIG. 7.

The machine learning engine 108 of the platform 105 is configured to adjust one or more parameters of the given IoT deployment based at least in part on feedback information characterizing monitored behavior of one or more other IoT deployments in one or more other usage contexts. For example, machine learning engine 108 may be configured to perform automated adjustment of parameters controlling one or more policy-based tradeoffs between reduced latency and increased accuracy for the given IoT deployment in the particular usage context. Such adjustments illustratively utilize one or more machine learning tools implemented within the machine learning engine 108 of the processing platform 105. For example, machine learning functionality of the machine learning engine 108 may be implemented at least in part utilizing a machine learning tool such as the Machine Learning Library (MLlib) of Apache Spark™. Machine learning may utilize principal component analysis, clustering, classification or other types of analysis.

In some embodiments, the particular usage context referred to above is one of a plurality of usage contexts of the IoT deployment, and the platform 105 is further configured to optimize the IoT deployment over the plurality of usage contexts.

For example, the platform 105 is illustratively configured to perform global optimization across a set of multiple usage contexts in order to control configuration and deployment of the IoT infrastructure utilizing external infrastructure deployment and configuration services, and to perform local optimization for the particular usage context in order to control configuration and deployment of the workflow processes of the given IoT deployment utilizing external IoT services and workflow frameworks.

Additionally or alternatively, the platform 105 may be configured to implement an applications marketplace comprising a plurality of applications associated with respective ones of a plurality of distinct usage contexts. For example, the configuration and deployment controller 106 can be configured to implement an applications marketplace comprising vendor-defined applications, system integrator applications and third-party applications, as well as other types of applications, utilizable within a given one of the sets of resources for implementing a corresponding one of the IoT platforms 112.

The configuration and deployment controller 106 may be configured to receive requirements input for respective ones of a plurality of requested IoT deployments from one or more of the user devices 102. Such requirements input may be in any of a wide variety of different formats and in some embodiments reflects particular customer needs associated with deployment of a requested IoT platform in a given use case or vertical. For example, requirements input provided to the configuration and deployment controller 106 can include indications received from a given one or the user devices 102 responsive to lists of available features presented to a user in one or more user interface screens.

The individual IoT devices that comprise one or more of the sets of IoT devices 114 are in some embodiments distributed over a wide geographic area, and are configured to communicate over one or more networks with their corresponding deployed IoT platforms 112. These IoT devices illustratively comprise, for example, distributed sensors, smart objects, smart appliances, smart automobiles or other types and arrangements of interconnected IoT devices. For example, one type of IoT device comprises a sensor that incorporates functionality to monitor and measure a set of properties associated with its surroundings, and communication functionality to make these measurements available to other system entities. It is also possible for some of the IoT devices to comprise more sophisticated devices such as mobile telephones, laptop computers, tablet computers or other types of processing devices. Additional illustrative examples of these and other types of IoT devices are disclosed in ITU-T Recommendation Y.2060, June 2012, which is incorporated by reference herein. Accordingly, the term "IoT device" as used herein is intended to be broadly construed.

A given one of the IoT platforms 112 may itself also be distributed. For example, a given IoT platform in some embodiments is implemented using a plurality of distributed processing nodes, illustratively comprising cloud compute nodes and cloud storage nodes of cloud infrastructure, although numerous other arrangements are possible.

As a more particular example, a distributed implementation of a given one of the IoT platforms 112 in one embodiment is configured to perform analytics operations in accordance with a processing framework supported by an Apache Hadoop YARN ("Yet Another Resource Negotiator") cluster. Examples of frameworks supported by the Hadoop YARN platform include MapReduce, Spark, Hive, MPI and numerous others. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein.

In some embodiments, a plurality of processing nodes collectively implement at least a portion of a distributed IoT platform that is more particularly in the form of a multi-cluster distributed data processing platform. Such a platform may comprise, for example, a plurality of potentially geographically-distributed YARN clusters each comprising a corresponding cluster of distributed processing nodes. A wide variety of other types of processing nodes can be used in other embodiments.

It is to be appreciated that the particular arrangement of system elements shown in FIG. 1 is for purposes of illustration only, and that other arrangements of additional or alternative elements can be used in other embodiments. For example, numerous alternative information processing system configurations can be used to implement IoT platform configuration and deployment functionality as disclosed herein.

Although illustratively shown as being part of the platform 105 in the FIG. 1 embodiment, one or more system components such as machine learning engine 108 and insight optimizer 110 in other embodiments can be implemented at least in part externally to the platform 105. The platform 105 may have access to these or other system components over the network 104 or one or more other networks of system 100.

Also, in other embodiments, functionality described herein as being associated with particular components of the system 100 may be implemented at least in part using additional or alternative components of the system 100.

As mentioned previously, the information processing system 100 is assumed in the present embodiment to be implemented on a given processing platform comprising one or more processing devices. Such a processing platform can comprise various combinations of physical and virtual resources. Illustrative examples of such processing platforms that may be used to implement at least portions of the system 100 will be described in more detail below in conjunction with FIGS. 8 and 9. These and other processing platforms in some embodiments are implemented using cloud infrastructure.

Some embodiments are configured to utilize data sets and metadata characterizing those data sets, as well as techniques for reasoning over such metadata and possibly also corresponding data set content, as described in U.S. Pat. No. 8,838,556, entitled "Managing Data Sets by Reasoning over Captured Metadata," and U.S. Pat. No. 9,141,908, entitled "Dynamic Information Assembly for Designated Purpose based on Suitability Reasoning over Metadata," both of which are incorporated by reference herein. Further details can be found in U.S. patent application Ser. No. 14/487,520, filed Sep. 16, 2014 and entitled "Data Set Virtual Neighborhood Characterization, Provisioning and Access," which is incorporated by reference herein.

It is to be appreciated, however, that the data sets, data set metadata and reasoning techniques described in these references are considered examples only, and need not be utilized in other embodiments.

Additional details regarding semantic matching functionality that may be implemented in a data set discovery engine can be found in U.S. patent application Ser. No. 15/074,597, filed Mar. 18, 2016 and entitled "Data Set Discovery Engine Comprising Relativistic Retriever," which is incorporated by reference herein.

In some embodiments, the platform 105 can be configured to associate metadata with respective ones of the workflow processes, and to perform semantic reasoning over the metadata as part of optimization of the IoT deployment. The semantic reasoning illustratively utilizes techniques described in one or more of the above-cited references.

As another example, other illustrative embodiments can be configured to implement metadata-based data set operational signature generation and associated automated performance of management operations for data sets in the context of data lake cross currents, as described in U.S. patent application Ser. No. 14/614,011, filed Feb. 4, 2015 and entitled "Integrating Compliance and Analytic Environments Through Data Lake Cross Currents," which is incorporated by reference herein.

Some embodiments are illustratively configured to utilize multi-latency techniques such as those disclosed in U.S. Pat. No. 9,600,358, entitled "Scalable Monitoring and Error Handling in Multi-Latency Systems," and U.S. Pat. No. 9,477,691, entitled "Multi-Latency Data Management," both of which are incorporated by reference herein. Other examples of techniques that may be incorporated in illustrative embodiments include those disclosed in U.S. patent application Ser. No. 13/832,412, filed Mar. 15, 2013 and entitled "A Holistic Methodology for Big Data Analytics," and U.S. Pat. No. 9,075,668, entitled "Method, Apparatus and System for Integrating Dynamic Recognition of Complex Events with Case-Based Processing," both of which are incorporated by reference herein.

These and other embodiments can be adapted for utilization in a wide variety of different information processing contexts, including health care, bioinformatics, financial services, telecommunications, manufacturing, transportation, smart cities, and other contexts characterized by the need for automated performance of IoT-based system functionality.

An example process suitable for implementation in the system 100 will now be described with reference to the flow diagram of FIG. 2. The process as shown includes steps 200, 202 and 204, and is suitable for use in the system 100 but is more generally applicable to other types of information processing systems.

In step 200, IoT infrastructure for a given IoT deployment in at least one particular usage context is determined. With reference to the FIG. 1 embodiment, the given IoT deployment illustratively comprises a particular one of the deployed IoT platforms 112 configured to interact with a corresponding one of the sets of IoT devices 114.

In step 202, placement of multiple workflow processes for the IoT deployment over a plurality of distributed locations within the IoT infrastructure is controlled. For example, the placement of multiple workflow processes for the IoT deployment over the plurality of distributed locations within the IoT infrastructure is illustratively controlled by the configuration and deployment controller 106 of the FIG. 1 embodiment utilizing its insight optimizer 110 to provide a designated distribution of data, services, applications and analytics for the IoT deployment in the particular usage context.

In step 204, execution of the workflow processes at the distributed locations is managed in accordance with one or more constraints of the particular usage context. For example, managing the execution of the workflow processes at the distributed locations in accordance with one or more constraints of the particular usage context illustratively includes arranging at least a subset of the workflow processes in a plurality of process lanes each corresponding to one or more of data acquisition, data aggregation, data reconciliation, analytics, insight, decision and action, and controlling transitions among the process lanes based at least in part on the one or more constraints of the particular usage context.

Steps 200, 202 and 204 are illustratively performed by the IoT distributed management optimization platform 105 utilizing its configuration and deployment controller 106 and machine learning engine 108.

In some embodiments, a given one of the deployed IoT platforms 112 is configured to perform Big Data analytics on IoT data supplied by its corresponding set of IoT devices 114. Additional details regarding Big Data analytics that can be implemented in illustrative embodiments of the present invention are described in U.S. Pat. No. 9,031,992, entitled "Analyzing Big Data," which is commonly assigned herewith and incorporated by reference herein.

Such a deployed IoT platform is illustratively configured to leverage one or more frameworks supported by Hadoop YARN, such as MapReduce, Spark, Hive, MPI and numerous others, to support distributed computations relating to the IoT devices.

Figure 2:
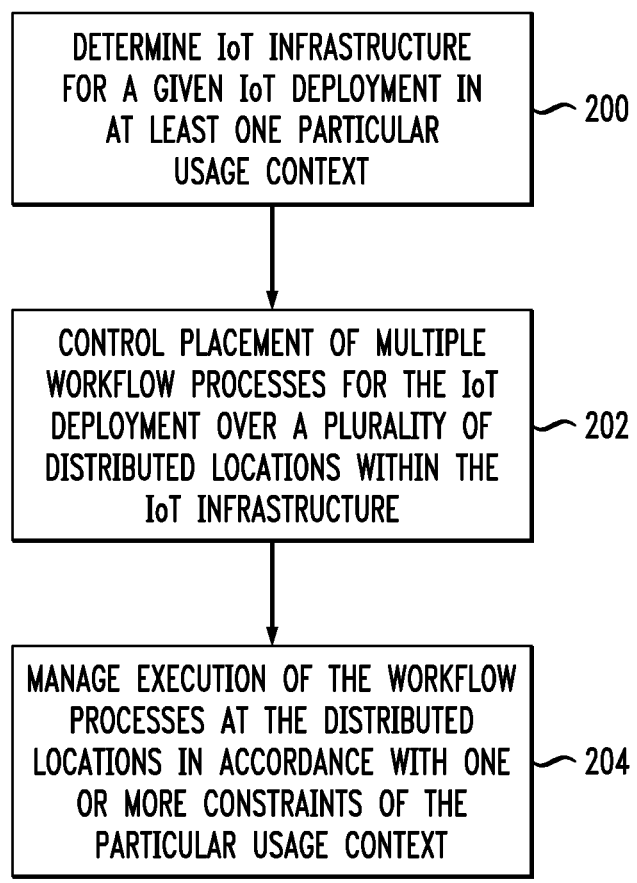
FIG. 2 is a flow diagram of an example process for distributed management optimization for IoT deployments in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing IoT platform configuration and deployment functionality. For example, the ordering of the process steps may be varied in other embodiments, or certain steps may be performed concurrently with one another rather than serially. Also, one or more of the process steps may be repeated periodically for reconfiguring or otherwise adjusting one or more deployed IoT platforms, or multiple instances of the process can be performed in parallel with one another for configuration and deployment of additional IoT platforms.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 through 7.

Figure 3:
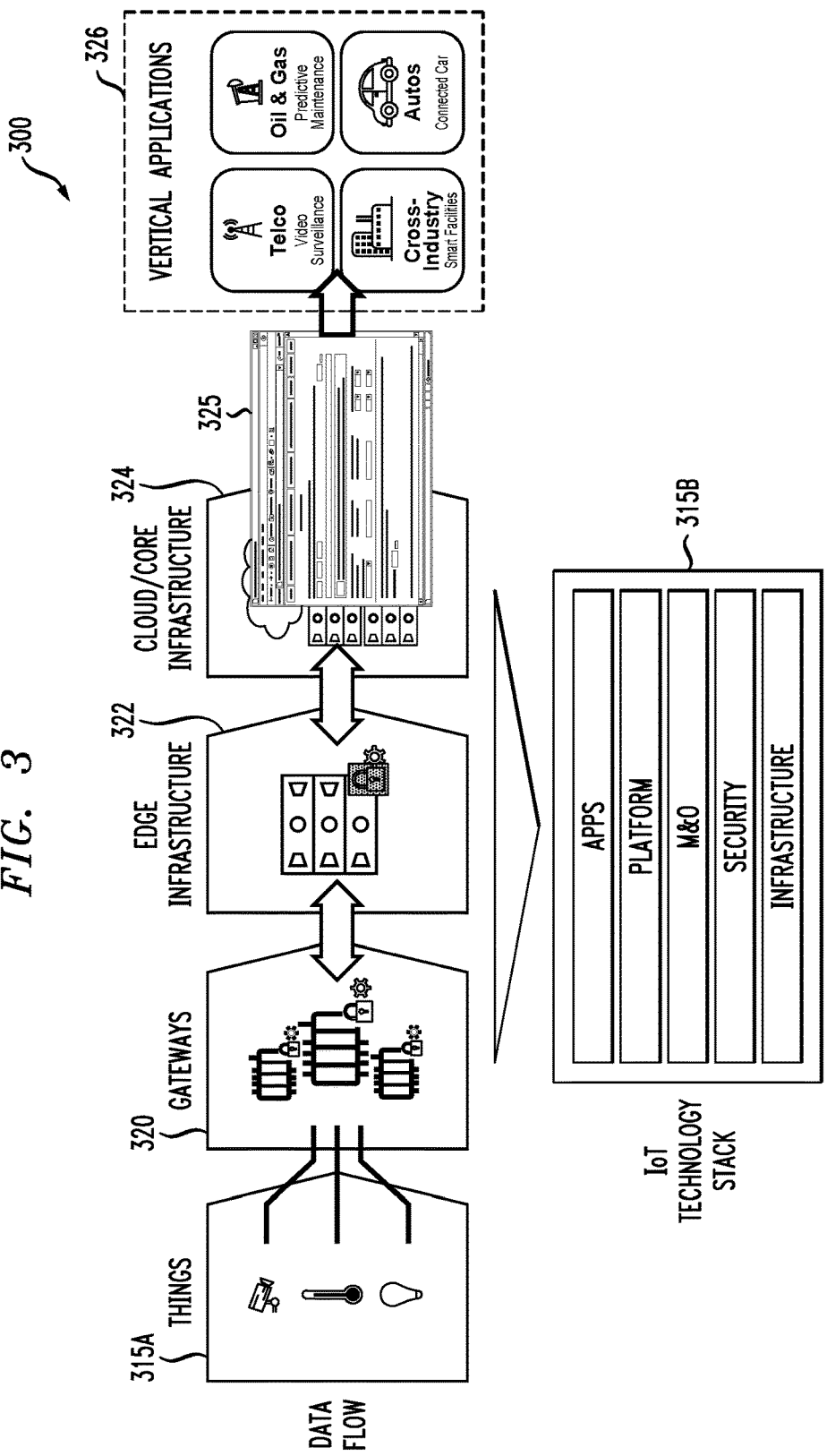
FIG. 3 shows examples of IoT deployments configured utilizing distributed management optimization in the information processing system of FIG. 1.

Referring initially to FIG. 3, an information processing system 300 comprises a set of IoT devices 315A ("Things") associated with an IoT technology stack 315B. The IoT technology stack 315B comprises a plurality of layers including an infrastructure layer, a security layer, a management and orchestration ("M&O") layer, a platform layer and an applications layer, although other types and arrangements of layers can be used in an IoT technology stack in other embodiments, involving a wide variety of different combinations of hardware, software and firmware. In some embodiments, a given deployed IoT platform at the platform layer is configured to execute workflows deployed at the application layer using IoT infrastructure deployed at the infrastructure layer.

The system 300 further comprises gateways 320, edge infrastructure 322, and cloud/core infrastructure 324. The gateways 320 and edge infrastructure 322 in some embodiments are configured utilizing EdgeX Foundry™ techniques to implement edge computing functionality, although numerous other configurations may be used. EdgeX Foundry™ is a vendor-neutral open source project of the Linux Foundation, building a common open framework for IoT edge computing. At the heart of the project is an interoperability framework hosted within a full hardware- and OS-agnostic reference software platform to enable an ecosystem of plug-and-play components that unifies the marketplace and accelerates the deployment of IoT solutions. In some embodiments, EdgeX Foundry™ is utilized as an external IoT services and workflow framework for a given IoT deployment.

The edge infrastructure 322 and cloud/core infrastructure 324 in some embodiments are supplemented by what are referred to herein as "fog nodes" of the system 300. The term "fog nodes" is intended to encompass a plurality of system nodes associated with various fog computing arrangements in which a hierarchy of elements are arranged between a cloud and endpoint devices, and/or between endpoint devices and gateways, in order to meet IoT deployment challenges relating to latency, network bandwidth, reliability and security in a high performance, open and interoperable way, as advanced by the OpenFog™ Consortium. For example, a fog node may be arranged above multiple edge nodes in a given IoT deployment pattern.

The cloud/core infrastructure 324 illustratively supports one or more web-based interfaces 325 for each of a plurality of vertical applications 326. The vertical applications 326 may be associated with at least one applications marketplace.

The system 300 illustratively represents a given one of the deployed IoT platforms 112 and its corresponding one of the sets of IoT devices 114 in the context of the FIG. 1 embodiment. The system 300 is assumed to be configured and deployed at least in part under the control of the configuration and deployment controller 106 of platform 105 utilizing machine learning engine 108 and insight optimizer 110.

For example, the platform 105 may be configured to implement policy-based selection of an IoT deployment pattern based at least in part on contextual information associated with the IoT deployment in a particular usage context. Such an IoT deployment pattern can specify, for example, an edge-to-fog node configuration such as that described above, in which a fog node is arranged above multiple edge nodes.

The platform 105 is more particularly configured to optimize the placement and interaction of distributed data, services, applications and analytics in particular IoT usage contexts in an automated manner. Such an arrangement advantageously overcomes significant problems of conventional practice relating to IoT platform deployment. As mentioned previously, these problems include limited scalability, excessive deployment costs and sub-optimal performance, as well as the need for excessive manual intervention.

The platform 105 in configuring and deploying an IoT platform such as that represented by system 300 automatically determines optimal placements of workflow processes to support particular IoT usage contexts. For example, the platform 105 determines specific locations within IoT infrastructure for deployment of workflow processes. These locations may include IoT device locations, gateway locations, edge node locations, fog node locations, core data center locations and cloud locations. Placing workflow processes in different locations has implications on the types and amount of data that can be considered, on insight and decision and action latency, on resource costs and utilization, and on the degree of satisfaction of business and regulatory constraints. The platform 105 is therefore configured to choose an optimal infrastructure, to optimize process deployment and workflows, and to iteratively improve system operations, subject to one or more constraints of the particular usage context.

In some embodiments, the platform 105 in implementing distributed management optimization for a given IoT deployment is focused on latency considerations for obtaining data, aggregating data, determining insights, making decisions, and taking action. For example, process workflows are illustratively grouped into process lanes, with explicit consideration of earliest and latest times for transition from one process lane to another process lane, as well as associated tradeoffs.

Latency considerations taken into account for distributed management optimization in a given embodiment can include multiple latencies across a data latency spectrum, ranging from ultra-low latency messages having latencies on the order of a microsecond or less, to real-time event characterizations having latencies on the order of 500 milliseconds or less, to intraday analyses having latencies on the order of 30 minutes or less, to daily rollup analyses having latencies on the order of 8-24 hours, to medium-term or long-term historical analyses having latencies on the order of months or years of data considered.

Optimization with respect to constraints on latency, resources, and other system parameters can be performed at multiple levels, including infrastructure optimization, usage context optimization, intra-lane processing optimization, and a feedback loop for iterative optimization. Techniques that are deployed in such optimization include global infrastructure optimization via simulated annealing, local optimization using hill climbing to improve on standard IoT deployment patterns, and machine learning and data lookup for intra-lane processing optimization and for ongoing, iterative optimization. This approach determines an optimal deployment of workflow processes for generating analyses, insights, decisions, and actions in a particular usage context, at significantly reduced operational expenditure.

Although described primarily herein in usage contexts involving IoT deployments, the disclosed techniques can be adapted in a straightforward manner to other usage contexts, such as placement of services in an M&O environment. This is an example of an environment in which metrics are gathered, analysis is carried out to gain insights, and decisions and actions are taken, all within constraints on latency and resources. For example, the platform 105 can be configured to automatically perform one or more M&O operations in an M&O environment, possibly outside of the IoT deployment context.

Sequential and overlapping latencies in a given embodiment affect end-to-end time for taking actions in an IoT deployment such as system 300 of FIG. 3. Examples of such latencies are listed below.

Data Latency. Depends on factors such as placement, distribution, data synchronization (e.g., "multi-latency" tables), filtering, and aggregation.

Insight Latency. Depends on factors such as amount of data needed, analytics/application computation time, and tolerance for false positives and false negatives.

Decision Latency. Depends on factors such as application time for policies and rules, approval time, and regulations.

Action Latency. Depends on factors such as action communication (e.g., to actuator) and action duration (e.g., may involve further verification and/or observation).

Synchronization Latency. Depends on factors such as location-to-location transmission, queueing, and micro-batching times.

The end-to-end times for taking action that are impacted by latencies of the types listed above may be subject to various business, practical, and regulatory constraints.

The platform 105 is advantageously configured to provide a time-driven approach for controlled deployment of a given IoT architecture to support data, insight, decision and action timing for "right-placement" of capabilities and services. This approach is also insight-driven in that it optimizes for a deployable arrangement of data, analytics and applications workflow processes to achieve insights, decisions and actions. It considerably facilitates data management, analytics management and application development for IoT usage contexts, while also automating deployment of workflow processes across particular arrangements of IoT devices, gateways, edge infrastructure and cloud/core infrastructure, resulting in simplified, flexible and cost-effective IoT deployments across a wide range of usage contexts.

Figure 4:
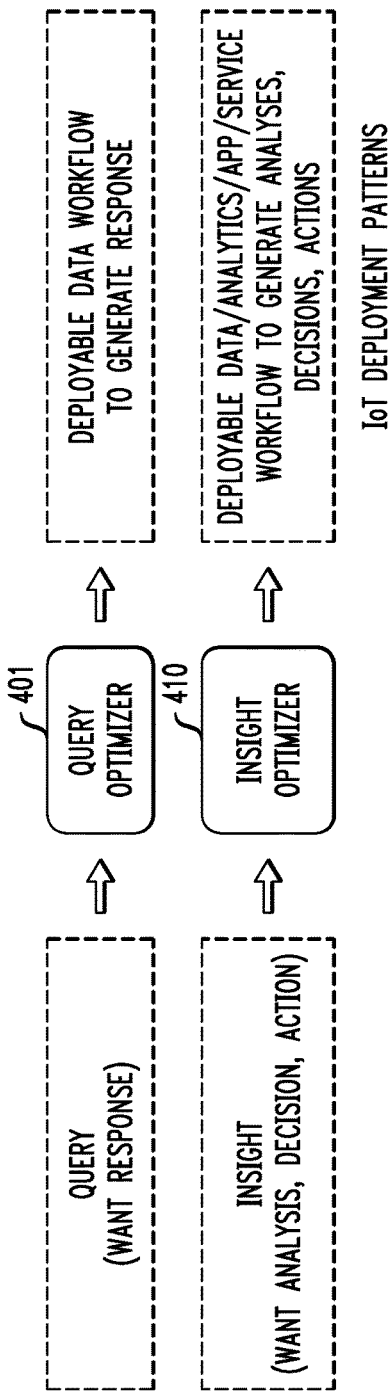
FIG. 4 compares functionality of an insight optimizer to functionality of a query optimizer in an illustrative embodiment.

As noted above, the platform 105 in some embodiments is insight-driven, utilizing insight optimizer 110. FIG. 4 compares functionality of an insight optimizer to functionality of a query optimizer in an illustrative embodiment. In an information processing system 400, a query optimizer 401 receives as its input a query, for which a submitting entity wants a response. The query optimizer 401 provides a deployable data workflow to generate the response desired by the submitting entity. For example, the query optimizer 401 may provide a given deployable data workflow within a range of possible workflows from simple data filtering to complex joins and aggregates.

An insight optimizer 410 in this embodiment receives as its input an insight, for which a submitting entity wants analysis, decision, and action. An example insight in a manufacturing or automotive context is that a motor is overheating. Other examples include detection of low tire pressure in a smart automobile, or recognition of unusually high energy consumption in a smart building. The insight optimizer 410 provides deployable workflow processes for data, analytics, applications and associated services to generate analyses, decisions and actions. The deployable workflow processes illustratively comprise one or more IoT deployment patterns. The insight optimizer 410 is insight-driven in that it optimizes the deployable workflow processes to achieve analyses, decisions and actions for a particular usage context. The insight optimizer 410 can provide deployable workflow processes within a range of possible deployable workflow processes from simple threshold-based processes to complex analytics.

Figure 5:
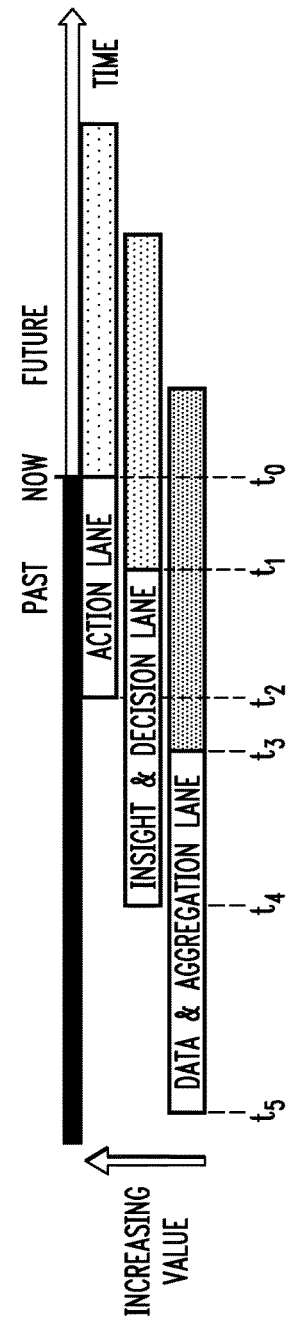
FIG. 5 is a timing diagram showing multiple value-based process lanes associated with distributed management optimization for an IoT deployment in an illustrative embodiment.

FIG. 5 shows a timing diagram 500 including multiple value-based process lanes associated with distributed management optimization for an IoT deployment in an illustrative embodiment. As indicated previously, the platform 105 in illustrative embodiments manages the execution of workflow processes placed over multiple distributed locations of IoT infrastructure in a given IoT deployment in a particular usage context. This illustratively involves arranging at least a subset of the workflow processes in a plurality of process lanes each corresponding to one or more of data acquisition, data aggregation, data reconciliation, analytics, insight, decision and action, and controlling transitions among the process lanes based at least in part on the one or more constraints of the particular usage context.

In this embodiment, the process lanes include three lanes, namely, a data and aggregation lane, an insight and decision lane, and an action lane. Other arrangements of more or fewer process lanes can be used in other embodiments. The process lanes are offset or staggered in time relative to one another, as shown in the figure.

The process lanes in the FIG. 5 embodiment are arranged from bottom to top in order of presumed increasing value, as indicated in the figure. Time $t_0$ indicates the current time ("Now"), and examples of previous times ("Past") are denoted $t_1$, $t_2$, $t_3$, $t_4$ and $t_5$. The action lane is defined by the time interval $t_0$-$t_2$, the insight and decision lane is defined by the time interval $t_1$-$t_4$, and the data and aggregation lane is defined by the time interval $t_3$-$t_5$.

In this particular arrangement of process lanes, the minimum time available to act on the latest insights and decisions is given by $t_0$-$t_1$, and the maximum time available to act on earliest insights and decisions is given by $t_0$-$t_2$. Similarly, the minimum time available to reach insights and decisions based on near-real-time data is given by $t_1$-$t_3$, and the maximum time available to reach insights and decisions based on near-real-time data is given by $t_1$-$t_4$. The age of the latest near-real-time data considered is given by $t_0$-$t_3$, and the age of the earliest near-real-time data considered is given by $t_0$-$t_5$.

The configuration and deployment controller 106 utilizes its insight optimizer 110 in order to control transitions among the process lanes for the given IoT deployment based at least in part on the one or more constraints of the particular usage context.

For example, in order to configure the IoT deployment to leverage more data but delay insights, the configuration and deployment controller 106 can minimize the time interval $t_3$-$t_4$. As another example, in order to configure the IoT deployment to act quickly on less data or incomplete data, the configuration and deployment controller 106 can minimize the time intervals $t_4$-$t_5$ and $t_0$-$t_2$. As a further example, in order to configure the IoT deployment to gain more thorough insights and make more considered decisions, the configuration and deployment controller 106 can minimize the time interval $t_1$-$t_2$. As yet another example, in order to configure the IoT deployment to act quickly on the earliest insights and decisions, the configuration and deployment controller 106 can minimize the time intervals $t_2$-$t_4$ and $t_0$-$t_2$.

The foregoing are illustrative examples of IoT distributed management optimizations carried out by the platform 105. Numerous other types of optimizations can be performed in these and other embodiments. The term "optimization" as used herein is intended to be broadly construed, and should not be viewed as requiring the achievement of particular minima or maxima for process lane time intervals or other system parameters.

As mentioned previously, the time constraints utilized by the platform 105 in controlling transitions among the process lanes can include a minimum time interval constraint for transitioning from a first one of the process lanes to a second one of the process lanes, a maximum time interval constraint for transitioning from a first one of the process lanes to a second one of the process lanes, or various data age constraints between data acquisition and one or more of data aggregation, data reconciliation, analytics, insight, decision and action, as well as combinations of these and other types of constraints.

A given process lane of the type described above illustratively comprises a grouping of one or more workflow processes, and may be configured as a data lane, an aggregation lane, an insight lane, a decision lane, an action lane, or various combinations of such lanes as in the FIG. 5 embodiment. Additional lanes are possible, such as a data reconciliation lane and an analytics lane. The platform 105 controls transitions among the process lanes for a given IoT deployment. A process lane can include one or more sub-processes, such as looking up additional data or pursuing a speculative search for an insight.

References herein to transitions among multiple process lanes are intended to be broadly construed so as to encompass, for example, a transition from a given lane to an immediately adjacent lane, as well as a transition from the given lane to another lane that is separated from the given lane by one or more other lanes.

Additional examples of intervals and constraints that may be applied in a given embodiment include those listed below.

Min Time Interval (Usage Context, Process, Location): An estimate of the minimum time needed for a process (e.g., stream data) to provide usable results at a location, given a particular usage context.

Max Time Interval (Usage context, Process, Location): Establishes a policy of the maximum time to wait for a near-real-time usable result (e.g., sufficient data, or an outcome such as an insight or decision) of a process at a location, given a particular usage context.

Workflow Time Constraint: A constraint on the maximum time to complete a workflow, including inter-location connection latencies. Such a constraint may be related to achievement of service level agreements (SLAs).

Workflow Cost Constraint: A constraint on the cost of supporting a given workflow, possibly characterized as a sum of process lane costs.

Infrastructure Cost Constraint: A constraint on the cost of deploying and supporting a given IoT infrastructure of interconnected locations.

Location-Process Constraint: A requirement to locate a process at a particular location for a given usage context. Such a constraint may be relaxed for local hill climbing.

Location Resource Constraint: A constraint on finite location resources. Such a constraint may limit usage context parallelism or add latency by increasing service times due to contention. Resources may vary as they are deployed and returned.

Regulatory Constraint: A constraint on data or process location, access rights, latency of actions, latency profile of a workflow, etc.

Again, these are only examples of constraints that may be associated with a given usage context in illustrative embodiments. Numerous other types and combinations of constraints can be utilized by the platform 105 in controlling placement of workflow processes at respective locations within IoT infrastructure for a given IoT deployment and managing execution of those workflow processes.

Figure 6:
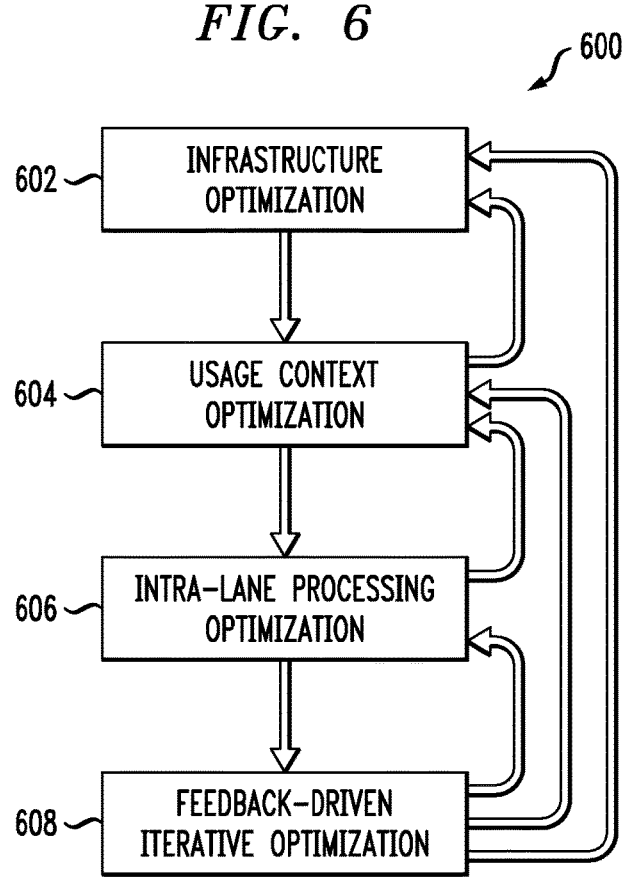
FIG. 6 is a flow diagram of another distributed management optimization process for IoT deployments in an illustrative embodiment.

FIG. 6 illustrates a distributed management optimization process 600 for IoT deployments in an illustrative embodiment. The process 600 includes steps 602, 604, 606 and 608, which are illustratively carried out by components 106, 108 and 110 of the IoT distributed management optimization platform 105 to optimize one or more IoT deployments in one or more usage contexts. The process 600 is an example of what is more generally referred to herein as a "multi-level optimization process" that includes at least two of IoT infrastructure optimization, usage context optimization and monitoring-based iterative optimization. In this embodiment, the multi-level optimization process is further configured to perform intra-lane processing optimization of an IoT deployment, possibly using machine learning and/or data lookup.

Step 602 comprises infrastructure optimization. In this step, the platform 105 optimizes IoT infrastructure for one or more IoT deployments. Such infrastructure optimization may include selecting IoT infrastructure for a set of usage contexts in order to allow subsequent usage context optimization to meet specified constraints. For example, the infrastructure optimization may determine if a tier of fog nodes is needed in the IoT infrastructure, or if the IoT infrastructure should be configured to deploy applications to edge nodes. These and other types of infrastructure optimization performed in step 602 can include global optimization via simulated annealing, resource sizing models, and other techniques.

Step 604 comprises usage context optimization. In this step, the platform 105 optimizes for a given usage context. This illustratively involves selecting an optimal workflow for the given usage context that meets all specified constraints. In some embodiments, the usage context optimization begins with one or more seed IoT deployment patterns, and then adjusts parameters such as timing and policies (e.g., thresholds for certainty) and location resources. The usage context optimization may explore migration of services and processes in the various process lanes to different locations within the IoT infrastructure. Local hill-climbing approaches can be used to improve the latency profile of the workflow at an acceptable cost. Multiple constraints may be weighted and balanced as goals within the given usage context and possibly across a workflow involving multiple usage contexts. The usage context optimization in some cases makes use of analytic models developed by data scientists and applications generated by application developers. In usage contexts in which the IoT infrastructure is fixed, the usage context optimization can determine how to achieve the best result in terms of optimal workflow benefit given those infrastructure constraints. It is also possible that multiple competing workflows for a given usage context may be evaluated via simulation or in a virtual competition.

Step 606 comprises intra-lane processing optimization. In this step, the platform 105 optimizes each of one or more process lanes. The intra-lane processing optimization in some embodiments involves selecting and executing one or more sub-processes within a given process lane. Data-pattern-driven or possibly rule-driven local decisions can be used to control further investigation. For example, the intra-lane processing optimization can look at additional data, execute a deeper analytic study, or transition to a different process lane.

Step 608 comprises feedback-driven iterative optimization. In this step, the platform 105 adjusts one or more parameters determined in at least one of steps 602, 604 and 606 based at least in part on feedback information characterizing monitored behavior of one or more IoT deployments in one or more usage contexts. This illustratively involves use of machine learning engine 108 to perform automated adjustment of parameters controlling one or more policy-based tradeoffs between reduced latency and increased accuracy for one or more IoT deployments in one or more usage contexts. For example, a feedback loop can be configured to determine if particular insights, decisions or actions were unduly delayed or otherwise unable to produce the expected benefit, as well as the underlying reasons for such conditions. The feedback loop can control changes in one or more of the infrastructure optimization, the usage context optimization and the intra-lane processing optimization to improve workflows and associated workflow benefits for one or more usage contexts.

Figure 7:
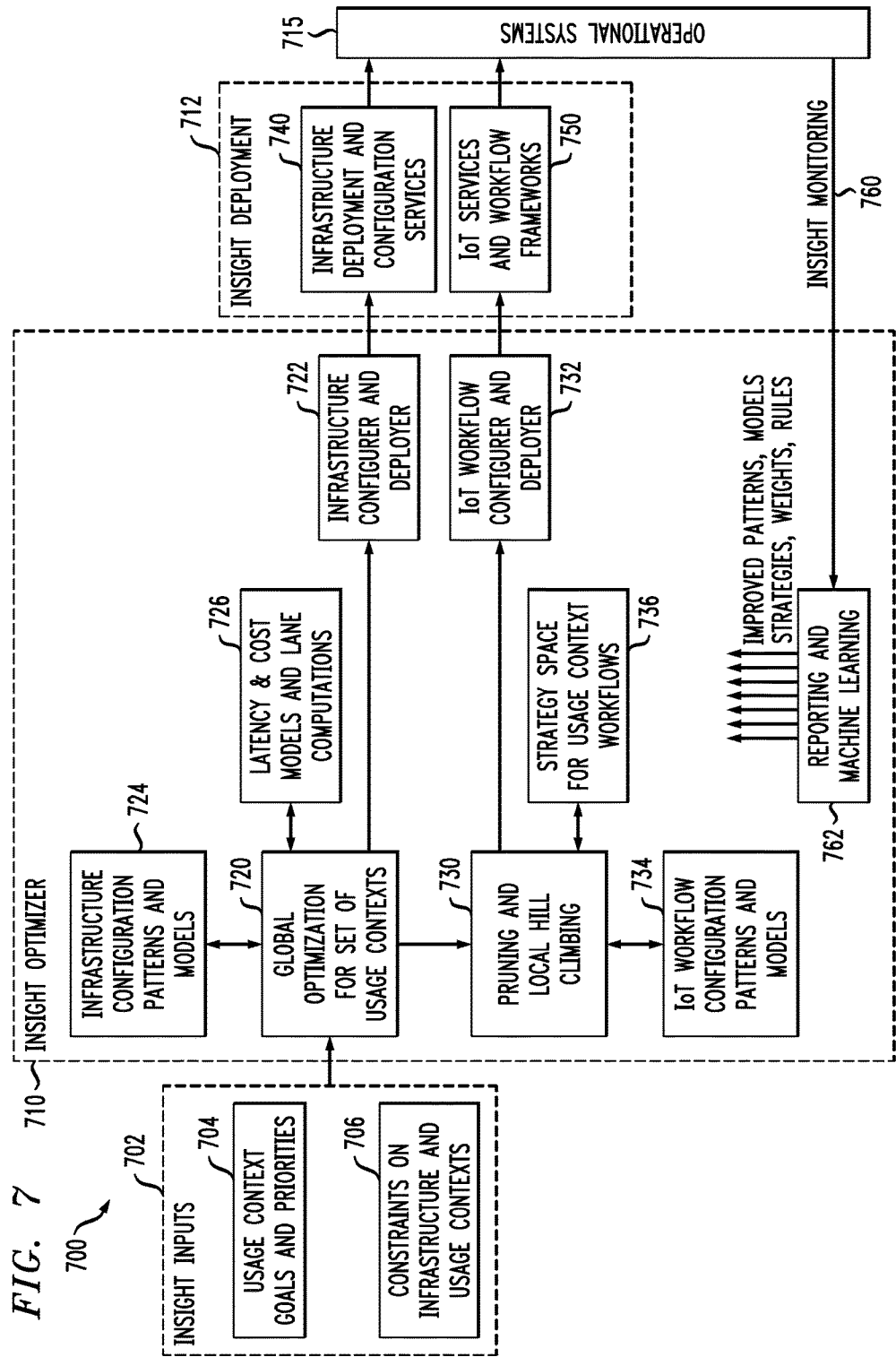
FIG. 7 is a block diagram of another information processing system having functionality for distributed management optimization for IoT deployments in an illustrative embodiment.

FIG. 7 shows an information processing system 700 having functionality for distributed management optimization for IoT deployments in an illustrative embodiment. The information processing system 700 receives insight inputs 702 including usage context goals and priorities 704 and constraints on infrastructure and usage contexts 706. These insight inputs 702 are applied to an insight optimizer 710 which may be viewed as corresponding generally to the insight optimizer 110 of the platform 105 in the FIG. 1 embodiment. Insights generated by the insight optimizer 710 are applied to an insight deployment module 712 which controls an IoT deployment utilizing components of operational systems 715.

The insight inputs 702 are more particularly applied to a global optimization module 720 of the insight optimizer 710. The global optimization module 720 performs global optimization across a set of multiple usage contexts in order to control configuration and deployment of the IoT infrastructure via infrastructure configurer and deployer 722. This global optimization illustratively involves utilization of infrastructure configuration patterns and models 724 and latency and cost models and associated lane computations 726.

The insight optimizer 710 further comprises a workflow strategy space pruning and local hill climbing module 730 configured to perform local optimization for a particular usage context in order to control configuration and deployment of the workflow processes of the given IoT deployment via IoT workflow configurer and deployer 732. This local optimization illustratively involves utilization of IoT workflow configuration patterns and models 734 and a strategy space for usage context workflows 736.

The global optimization module 720 controls infrastructure configurer and deployer 722 to configure and deploy infrastructure deployment and configuration services 740 of the insight deployment module 712 utilizing operational systems 715. The infrastructure deployment and configuration services 740 are illustratively shown as being external to the insight optimizer 710 in this embodiment.

The pruning and local hill climbing module 730 controls IoT workflow configurer and deployer 732 to configure and deploy IoT services and workflow frameworks 750 of the insight deployment module 712 utilizing operational systems 715. The IoT services and workflow frameworks 750 are also illustratively shown as being external to the insight optimizer 710 in this embodiment.

Insight monitoring 760 is performed on one or more IoT deployments in the system 700 as implemented using corresponding portions of operational systems 715. The insight monitoring 760 drives a reporting and machine learning module 762 which generates improved patterns, models, strategies, weights, rules and other parameters for use by the various modules of the insight optimizer 710.

The system 700 can be advantageously configured to support a wide variety of distinct functionality relating to data management, analytics management, application management, and optimization of insights and associated decisions. For example, with regard to insight and decision optimization, the system 700 can support functionality such as calculations to achieve required end-to-end latency, deployment and configuration of IoT infrastructure, deployment of services and workflows relating to data, analytics and applications, and agile reconfiguration for new insights/decisions.

The system 700 may additionally or alternatively be configured to utilize topography-based deployment patterns. Such patterns can be configured within modules 724 and 734 of the insight optimizer 710. Examples of topography-based deployment patterns that may be used in a given embodiment include those listed below.

1. Collect data in one place (e.g., edge to cloud, gateway to public cloud).

2. Test out edge analytics (e.g., edge only/small server, gateway to server/laptop).

3. Deploy edge analytics and harness core analytic and data capabilities (e.g., edge to core—gateway, on premise to core—stronger edge computing and connect to core).

4. Coordinate edge and core analytics using cloud data storage (e.g., edge to core, cloud—gateway, on-premises, core and cloud—edge to core to cloud enhancement).

5. Perform analytics at two levels—seconds to minutes & hours (e.g., edge to fog—gateway to appliance).

6. Distribute data & analytics with existing analytics (e.g., edge to fog to core—gateway to appliance to core).

7. Distribute data and analytics strategically to cover latency spectrum and develop new applications and analytics (e.g., edge to fog to cloud—gateway to appliance to cloud).

8. Segment geographically with overall picture (e.g., multi-data center—core 1/core 2—combined with on-premises computing with gateways).

9. Move raw data from car to processing point (e.g., edge to service provider—primarily for connected car, no gateway).

10. Aggregate raw data for fleet processing (e.g., edge to gateway (moving) to service provider—aggregation point to service providers—car fleet).

11. Share heterogeneous data and develop cross-source analytics (e.g., multi-service/government integrations—smart city implementation, cloud to cloud).

The above are only examples of topography-based deployment patterns, and should not be construed as limiting in any way. Numerous alternative IoT deployment patterns may be used in other embodiments.

An example of a potential sequence of operations that can be performed in the system 700 is as follows.

1. Establish (e.g., specify) location/connection topology for IoT implementation.

2. Define (or measure) connection latencies (even static approach is a good starting point).

3. Define likely data and its sources (e.g., sensors, lookups) and availability (may be driven by step 6 below).

4. Define (or measure) process latencies.

5. Propose set of usage contexts and constraints.

6. Develop predictive models and applications (in parallel, constantly being improved).

7. Decide deployment of usage context or usage contexts (data, applications, analytics, process workflow) according to seed deployment pattern(s).

8. Perform local hill climbing (e.g., adjustments of placement) to meet constraints (e.g., latency).

9. Perform global optimization to meet resource constraints and limitations (compared to available resources).

10. Where usage contexts are actually deployed, use observation and machine learning to understand metrics and results.

11. Make improvements via optimization based on feedback loop.

Again, these particular operations and their sequence as shown above are examples only, and can be varied in other embodiments.

Alternative embodiments can be implemented in an M&O environment in addition or in place of an IoT deployment environment. For example, some embodiments can configure a distributed management optimization platform such as platform 105 of FIG. 5 to utilize a set of process lanes to collect metrics at multiple levels, to filter and aggregate metrics, to report on and visualize key metrics, to reach insights about system operations, to reach decisions about reactive and preventative responses, and to communicate decisions and initiate actions. Such an embodiment can implement optimization functionality relating to deployment of collectors, filters, aggregators, reporting and other services, deployment of analytics and applications, and deployment of messaging and service invocation. Illustrative insights may include that a data center is down, that connectivity has been lost between certain components, or that a security attack is being attempted.

These and other illustrative embodiments involving IoT deployment and/or M&O environments can make use of models, metrics and associated metric mapping and multi-model functionality disclosed in U.S. patent application Ser. No. 15/386,761, filed Dec. 21, 2016 and entitled "Processing Platform with Metric Mapping for Interoperability of Multiple Distinct Models," which is incorporated by reference herein.

As mentioned above, illustrative embodiments can be utilized for distributed management optimization of IoT deployments in a wide variety of different use cases and verticals.

For example, a given IoT deployment may be configured for improving safety and reliability of automobiles. Assume for purposes of illustration in the present example that a plurality of IoT-enabled smart automobiles have embedded sensors monitoring critical components. The data collected from these automobile sensors is processed at fog node compute endpoints where smart fault diagnosis modules quickly scan the data to find any potential failure situations. The data collected at the fog nodes can be further aggregated by the corresponding automobile manufactures to perform deep learning and complex analysis enabling prediction of possible defects or creation of new algorithms to improve safety and/or operational efficiencies. If a given one of the manufacturers detects the possibility of a catastrophic failure, the manufacturer takes preventative action by notifying the owners of the impacted automobiles and providing potential service recommendations. Proactive detection and action to prevent catastrophic failures save lives while also potentially avoiding large recalls by identifying and fixing the vehicles that are faulty.

Given the potentially large number of vehicles of a given make and model, as well as variations in their respective locations and operating conditions, automobile IoT systems will typically include large numbers of locations at which to collect data, process and analyze the data and alert owners. The use of automated IoT distributed management optimization functionality as disclosed herein in deploying data collecting, processing, analyzing and alerting processes for such an automobile IoT system avoids the substantial drawbacks that would otherwise be associated with human deployment and maintenance of such a system.

The smart automobile in the present example is also referred to as a "connected car." Data may be continuously collected from various IoT edge elements (e.g., sensors) in the connected car and sent to a data center for advanced and detailed analytics. Insights in this example include the above-described real-time monitoring of vehicle health, with such insights being leveraged for precision recalls (e.g., only certain vehicles are recalled and not all vehicles of a certain model, year, etc.). Another possible insight in this example involves continuous dynamic map generation, in which updated maps for on-board navigational systems are generated overnight and delivered back to the connected cars.

Another example of an IoT deployment in a particular usage context is a smart building solution that focuses on the application of Deep Learning using Artificial Intelligence (AI) within an IoT platform. The IoT deployment is illustratively configured to optimize asset utilization and energy efficiency in a smart building, including the optimized maintenance of monitored assets, enhanced energy efficiency through adjustments in all power-consuming services, and improvement of employee and visitor experience while in the building. Deep Learning converges IoT data from multiple domains and sources to a single trained neural network model. A neural network based on the trained neural network model creates end user value with real-time sensor data. Latencies are relevant in this example for predictive maintenance of assets in the smart building connecting to maintenance schedules and support, for energy consumption management requiring real-time data and real-time insights in order to optimize energy usage and limit waste, and finally for providing a comfortable environment to both workers and visitors. Managing such latencies in an optimal manner utilizes real-time data and decision making as well as insights from the neural network based on what was learned, leveraging existing and historical data as well as external information such as environmental data.

Yet another example of an IoT deployment in a particular usage context is a smart factory configured to optimize quality control. In this example, multiple sensors of the IoT deployment are used to monitor in real time the quality of automotive parts production. Such a solution can be configured to detect high defect rates in the production of the automotive parts. Real time analytics and integration of various measurements via the multiple sensors leads to additional insights such as discovering that certain external environmental factors (e.g., temperature and humidity) have an adverse impact on quality. Addressing such issues via the IoT deployment helps to improve quality and reduce waste.

It is to be appreciated that the particular verticals and use cases referred to above and elsewhere herein are presented as illustrative examples only, and that embodiments of the invention can be implemented in a wide variety of different IoT contexts, from small-scale IoT deployments such as smart homes to large-scale IoT deployments in factory automation and smart city arrangements.

As indicated elsewhere herein, illustrative embodiments can provide a number of significant advantages relative to conventional arrangements.

For example, illustrative embodiments allow IoT platforms to be configured and deployed in a particularly efficient manner that is readily scalable to increasingly larger numbers of IoT devices.

A given IoT platform deployed in this manner can potentially integrate a diverse array of applications and other resources from different vendors, partners, system providers and system integrators. Such arrangements facilitate satisfaction of customer needs while also reducing costs and improving performance.

In addition, the need for manual intervention in IoT deployments is advantageously avoided. One or more illustrative embodiments instead implement fully automated IoT distributed management functionality that improves itself over time through the use of machine learning techniques.

Moreover, some embodiments allow combinations of legacy or "brownfield" IoT devices with new or "greenfield" IoT devices to be easily accommodated by a given one of the deployed IoT platforms.

In some embodiments, IoT platform configuration and deployment is highly dynamic and takes into consideration information obtained from monitored IoT device behavior utilizing analytics.

Illustrative embodiments can broadly scale across numerous distinct industries or other verticals, as well as across numerous use cases associated with diverse customer needs within each such vertical.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments, such as the information processing systems 300 and 700 of respective FIGS. 3 and 7 described previously.

Figure 8:
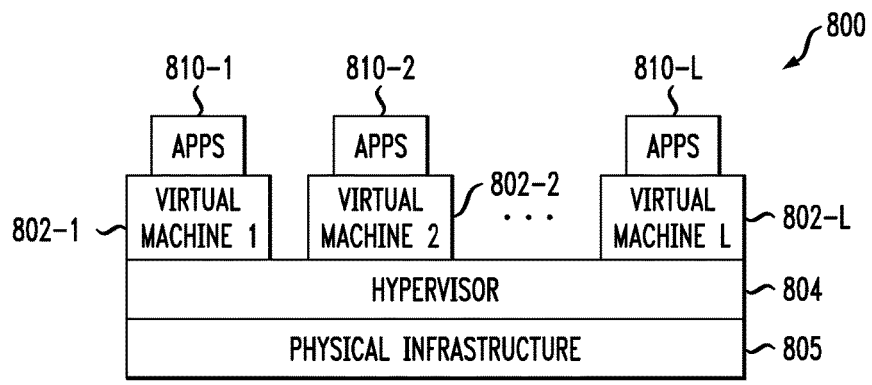
FIGS. 8 and 9 show examples of processing platforms that may be utilized to implement at least a portion of an information processing system in illustrative embodiments.
Figure 9:
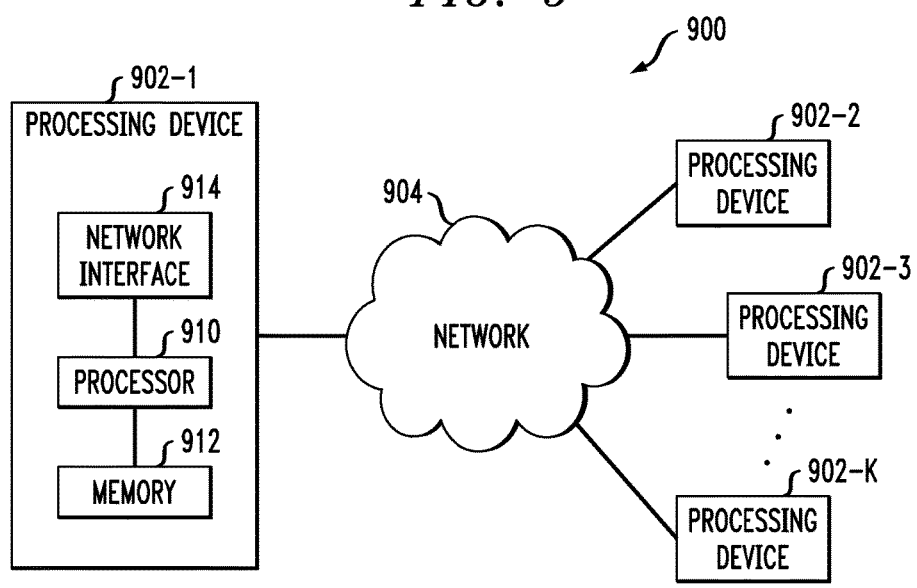

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 804 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement IoT distributed management optimization functionality as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of configuration and deployment controller 106, machine learning engine 108 and insight optimizer 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide distributed management of IoT deployments. Also, the particular configurations of system and device elements shown in the figures can be varied in other embodiments. Thus, for example, the particular type of IoT distributed management system and associated IoT deployments implemented in a given embodiment and their respective configurations may be varied. Other features of the illustrative embodiments such as insight optimization, process lanes and machine learning functionality can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processing platform comprising one or more processing devices each having at least one processor coupled to a memory;
the processing platform implementing an Internet of Things (IoT) distributed management system accessible to a plurality of user devices over at least one network;
the processing platform being configured:
to determine IoT infrastructure for a given IoT deployment in at least one particular usage context;
to control placement of multiple workflow processes for the IoT deployment over a plurality of distributed locations within the IoT infrastructure; and
to manage execution of the workflow processes at the distributed locations in accordance with one or more constraints of the particular usage context;
wherein the IoT deployment comprises one or more IoT platforms each configured to interact with a different set of IoT devices.

2. The apparatus of claim 1 wherein the placement of multiple workflow processes for the IoT deployment over the plurality of distributed locations within the IoT infrastructure provides a designated distribution of data, services, applications and analytics for the IoT deployment in the particular usage context.

3. The apparatus of claim 1 wherein the plurality of distributed locations within the IoT infrastructure comprise two or more of IoT device locations, gateway locations, edge node locations, fog node locations, core data center locations and cloud locations.

4. The apparatus of claim 1 wherein managing the execution of the workflow processes at the distributed locations in accordance with one or more constraints of the particular usage context comprises arranging at least a subset of the workflow processes in a plurality of process lanes each corresponding to one or more of data acquisition, data aggregation, data reconciliation, analytics, insight, decision and action, and controlling transitions among the process lanes based at least in part on the one or more constraints of the particular usage context.

5. The apparatus of claim 4 wherein a given one of the constraints comprises at least one of:

a minimum time interval constraint for transitioning from a first one of the process lanes to a second one of the process lanes;

a maximum time interval constraint for transitioning from a first one of the process lanes to a second one of the process lanes; and a data age constraint between data acquisition and one or more of data aggregation, data reconciliation, analytics, insight, decision and action.

6. The apparatus of claim 1 wherein the processing platform is further configured to optimize the IoT deployment in the particular usage context utilizing a multi-level optimization process including at least two of IoT infrastructure optimization, usage context optimization and monitoring-based iterative optimization.

7. The apparatus of claim 1 wherein the processing platform is further configured to implement machine learning to adjust one or more parameters of the given IoT deployment based at least in part on feedback information characterizing monitored behavior of one or more other IoT deployments in one or more other usage contexts.

8. The apparatus of claim 7 wherein the machine learning implemented by the processing platform performs automated adjustment of parameters controlling one or more policy-based tradeoffs between reduced latency and increased accuracy for the given IoT deployment in the particular usage context.

9. The apparatus of claim 4 wherein the processing platform is further configured to perform intra-lane processing optimization for each of one or more of the process lanes of the IoT deployment.

10. The apparatus of claim 1 wherein the processing platform is further configured to perform global optimization across a set of multiple usage contexts in order to control configuration and deployment of the IoT infrastructure utilizing external infrastructure deployment and configuration services.

11. The apparatus of claim 1 wherein the processing platform is further configured to perform local optimization for the particular usage context in order to control configuration and deployment of the workflow processes of the given IoT deployment utilizing external IoT services and workflow frameworks.

12. The apparatus of claim 1 wherein the processing platform is further configured for at least one of:
automatically performing one or more management and orchestration operations in a management and orchestration environment;
automatically generating the multiple workflow processes for the IoT deployment for placement over the plurality of distributed locations within the IoT infrastructure; and
automatically balancing multiple constraints relating to the placement and execution of the multiple workflow processes.

13. The apparatus of claim 1 wherein the processing platform is further configured to associate metadata with respective ones of the workflow processes, and to perform semantic reasoning over the metadata as part of optimization of the IoT deployment.

14. The apparatus of claim 1 wherein the processing platform is further configured to implement policy-based selection of an IoT deployment pattern based at least in part on contextual information associated with the IoT deployment in the particular usage context.

15. A method comprising:
determining Internet of Things (IoT) infrastructure for a given IoT deployment in at least one particular usage context;
controlling placement of multiple workflow processes for the IoT deployment over a plurality of distributed locations within the IoT infrastructure; and
managing execution of the workflow processes at the distributed locations in accordance with one or more constraints of the particular usage context;
wherein the IoT deployment comprises one or more IoT platforms each configured to interact with a different set of IoT devices; and
wherein the method is performed by a processing platform comprising one or more processing devices each comprising a processor coupled to a memory.

16. The method of claim 15 wherein the placement of multiple workflow processes for the IoT deployment over the plurality of distributed locations within the IoT infrastructure provides a designated distribution of data, services, applications and analytics for the IoT deployment in the particular usage context.

17. The method of claim 15 wherein managing the execution of the workflow processes at the distributed locations in accordance with one or more constraints of the particular usage context comprises:
arranging at least a subset of the workflow processes in a plurality of process lanes each corresponding to one or more of data acquisition, data aggregation, data reconciliation, analytics, insight, decision and action; and
controlling transitions among the process lanes based at least in part on the one or more constraints of the particular usage context.

18. A computer program product comprising a non-transitory processor-readable storage medium having one or more software programs embodied therein, wherein the one or more software programs when executed by at least one processing device cause said at least one processing device:
to determine Internet of Things (IoT) infrastructure for a given IoT deployment in at least one particular usage context;
to control placement of multiple workflow processes for the IoT deployment over a plurality of distributed locations within the IoT infrastructure; and
to manage execution of the workflow processes at the distributed locations in accordance with one or more constraints of the particular usage context;
wherein the IoT deployment comprises one or more IoT platforms each configured to interact with a different set of IoT devices.

19. The computer program product of claim 18 wherein the placement of multiple workflow processes for the IoT deployment over the plurality of distributed locations within the IoT infrastructure provides a designated distribution of data, services, applications and analytics for the IoT deployment in the particular usage context.

20. The computer program product of claim 18 wherein managing the execution of the workflow processes at the distributed locations in accordance with one or more constraints of the particular usage context comprises:
arranging at least a subset of the workflow processes in a plurality of process lanes each corresponding to one or more of data acquisition, data aggregation, data reconciliation, analytics, insight, decision and action; and
controlling transitions among the process lanes based at least in part on the one or more constraints of the particular usage context.

* * * * *